US011126551B1

(12) United States Patent
Dargan et al.

(10) Patent No.: US 11,126,551 B1
(45) Date of Patent: Sep. 21, 2021

(54) DATA ACCESS FOR SYSTEM OF SYSTEMS OPERATIONAL ANALYTICS

(71) Applicant: The Government of the United States of America, as represented by the Secretary of Homeland Security, Washington, DC (US)

(72) Inventors: John L. Dargan, Ashburn, VA (US); Damian Garcia, Fort Washington, MD (US); Archie Turner, Williamsburg, VA (US); Carlos M. Lizardi, New Windsor, MD (US); Lorraine Castillo, Navarre, FL (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/081,638

(22) Filed: Oct. 27, 2020

(51) Int. Cl.
*G06F 12/0802* (2016.01)
*G06Q 10/06* (2012.01)
*G06F 3/06* (2006.01)
*G06Q 50/26* (2012.01)

(52) U.S. Cl.
CPC ........ *G06F 12/0802* (2013.01); *G06F 3/0622* (2013.01); *G06F 3/0655* (2013.01); *G06F 3/0679* (2013.01); *G06Q 10/0639* (2013.01); *G06Q 50/265* (2013.01)

(58) Field of Classification Search
CPC .. G06F 3/0679; G06F 3/0655; G06F 12/0802; G06F 3/0622; G06Q 10/0639; G06Q 50/26; G06Q 50/265
See application file for complete search history.

(56) References Cited

U.S. PATENT DOCUMENTS

| | | | |
|---|---|---|---|
| 10,339,056 B2 * | 7/2019 | Joshi | G06F 12/0815 |
| 2013/0103951 A1 * | 4/2013 | Klevan | H04L 9/3234 713/186 |
| 2017/0102694 A1 * | 4/2017 | Enver | G05B 19/41875 |

* cited by examiner

*Primary Examiner* — Zhuo H Li
(74) *Attorney, Agent, or Firm* — Lavanya Ratnam; Kelly G. Hyndman; Robert W. Busby

(57) ABSTRACT

Systems and methods are described, and an example system includes logic that implements a user interface and that accepts an indicator of data, and upon identifying the data is restricted access, receives via the interface attributes of tasks, and of the user, and determines a task-user attribute matrix based on the user input. The logic sends a data-coefficient request to access modules, receives a reply message that includes sensitivity metadata coefficient, a privacy metadata coefficient, a combinability metadata coefficient, and a security metadata coefficient. The logic constructs, using a content of the reply message, a metadata coefficient matrix. The logic applies a dynamic access evaluation that is based on the task-user attribute matrix and the metadata coefficient matrix and, upon a positive evaluation, accesses the restricted-access data and provides the accessed data to a data cache. Optionally, the data cache feeds a system of system operational analytics.

19 Claims, 10 Drawing Sheets

DATA ACCESS FOR SYSTEM OF SYSTEMS OPERATIONAL ANALYTICS

STATEMENT OF GOVERNMENT INTEREST

This invention was made with United States Government support, by employees of the United States Department of Homeland Security in the performance of their official duties. The United States Government has certain rights in this invention.

FIELD

This discussion generally relates to data access control for an enterprise system that assists with the employment of systems operational analytics tools.

BACKGROUND

The Department of Homeland Security (DHS) is a large enterprise in which nearly a quarter of a million people work to safeguard the American people, our homeland, and our values. These people serve in various operational components. The operational components include Citizenship and Immigration Services, the Coast Guard, Customs and Border Protection, the Cybersecurity and Infrastructure Security Agency, the Federal Emergency Management Agency, the Federal Law Enforcement Training Center, Immigration and Customs Enforcement, the Secret Service, and the Transportation Security Administration.

Component chief information officers (CIOs) evaluate the many aspects of their operations using information from different sources.

SUMMARY

For a system for use in accessing data in a system of systems operational analytics, an example implementation can include a hardware processor configured to perform a predefined set of basic operations in response to receiving a corresponding basic instruction selected from a predefined native instruction set of codes, and can include a memory, accessible to the processing system, the memory including a data cache. The implementation can include a user interface controller under control of the processing system, and logic, which can comprise a set of machine codes stored in the memory and selected from the predefined native instruction set of codes of the hardware processor, the set of machine codes can include one or more modules, including a user request module, a data broker module, a dynamic access evaluation module, a metadata coefficient collection module, and a data transfer module. The logic can implement an application that includes a user process, configured to access the system of systems operational analytics, and to implement a graphical user interface, via the user interface controller, upon a display. The graphical user interface can be configured to accept a data indicator that indicates a data, and the user process can be configured to identify whether the data is accessible and, when the data is restricted access, to obtain a restricted-access data indicator pertaining to the data. In an implementation, the graphical user interface can be configured to receive user inputs relating to task-user attributes, the task-user attributes including attributes of tasks and attributes of a user, and the user process can be further configured to determine, based at least on part on the user inputs, a task-user attribute matrix, containing first values. The user request module can be configured to output, based at least in part on the task-user attribute matrix, a user request message containing the first values and the restricted-access data indicator, and the data broker module can be configured to perform, based at least in part on receiving the user request message, a sending of the first values to the dynamic access evaluation module, and an electronic communication to the metadata coefficient collection module of a data request message containing the restricted-access data indicator. The metadata coefficient collection module can be configured to output, based at least in part on receiving the data request message, a data-coefficient request message to one or more access modules based on the restricted-access data indicator and, in an implementation, the one or more access modules receiving the data-coefficient request message can be configured to send, in association with receiving the data-coefficient request message, a metadata coefficient reply message that includes second values pertaining to the data, the second values including metadata coefficients comprising at least a sensitivity metadata coefficient, a privacy metadata coefficient, a combinability metadata coefficient, and a security metadata coefficient. In the implementation, the metadata coefficient collection module can be further configured to determine, upon receiving the metadata coefficient reply message, a metadata coefficient matrix of the second values, and to output the second values, from the metadata coefficient matrix, to the dynamic access evaluation module. In the implementation, the dynamic access evaluation module can be further configured to perform, upon receiving the second values from the metadata coefficient matrix, a dynamic access evaluation based at least in part on the first values and the second values and, upon a positive result of the dynamic access evaluation, to output an access authorization message, pertaining to the data, and the data transfer module can be configured to perform an access of the data, based at least in part on the access authorization message, and to provide the data to the data cache.

For a method for accessing inaccessible data, an implementation can include accepting a data indicator that indicates data, and identifying whether the data is restricted access and, when the data is restricted access data: accepting user inputs relating to tasks, attributes of tasks, and attributes of a user, determining a task-user attribute matrix, containing first values, based on the user inputs, outputting a user request message containing the first values and a restricted-access data indicator, receiving at a broker module the user request message and providing the first values, from the task-user attribute matrix, to a dynamic access evaluation module, outputting from the broker module a data request message containing the restricted-access data indicator, receiving, at a metadata coefficient collection module, the data request message and outputting in response a data-coefficient request message to one or more access modules based on the restricted-access data indicator, sending, from the one or more access modules receiving the data-coefficient request messages, a metadata coefficient reply message that includes second values pertaining to the data, the second values including metadata coefficients comprising at least a sensitivity metadata coefficient, a privacy metadata coefficient, a combinability metadata coefficient, and a security metadata coefficient, receiving, at the metadata coefficient collection module, the metadata coefficient reply message from the one or more access modules and, in response, determining a metadata coefficient matrix of the second values pertaining to the data, and outputting the second values to a dynamic access evaluation module, receiving, at the dynamic access evaluation module, the second values from the metadata coefficient matrix, and performing a dynamic access evaluation configured to produce an evaluation result that is determined, based on the first values and the second values, between a positive result and a negative result and, in response to the positive result, to output to a data transfer module an access authorization message, pertaining to the data, and performing, by a data transfer module, based at least in part on the access authorization message, an accessing of the data and providing of the data to a data cache, the data cache being accessible to a user process.

For a tangible computer-readable storage media, embodying computer-readable instructions, in an implementation the instructions can include instructions that cause a processor to: accept a data indicator that indicates data; identify whether the data is restricted access data and, when the data is restricted access data: accept user inputs relating to tasks, attributes of tasks, and attributes of a user, determine a task-user attribute matrix, containing first values, based on the user inputs, output a user request message containing the first values and a restricted-access data indicator, receive at a broker module the user request message, in response, provide the first values from the task-user attribute matrix to a dynamic access evaluation module, output from the broker module a data request message containing the restricted-access data indicator, receive at a metadata coefficient collection module the data request message and output a data-coefficient request message to one or more access modules, the one or more access modules being based on the restricted-access data indicator, send, from the one or more modules, based at least in part on the data-coefficient request message, a metadata coefficient reply message to the metadata coefficient collection module, the metadata coefficient reply message including second values, the second values pertaining to the data and including metadata coefficients comprising at least a sensitivity metadata coefficient, a privacy metadata coefficient, a combinability metadata coefficient, and a security metadata coefficient, receive at the metadata coefficient collection module the metadata coefficient reply message from the one or more access modules and, in response, determine a metadata coefficient matrix of the second values, and output the second values from the metadata coefficient matrix to the dynamic access evaluation module, receive at the dynamic access evaluation module the second values from the metadata coefficient matrix and, in response, perform a dynamic access evaluation that produces an evaluation result, the evaluation result being determined between a positive result and a negative result, based on the first values and the second values and, in response to the positive result, to output to a data transfer module an access authorization message, pertaining to the data, and receive at the data transfer module, the access authorization message and, in response, access the data and provide the data to a data cache, the data cache being accessible to a user process.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

DETAILED DESCRIPTION

Figure 1:
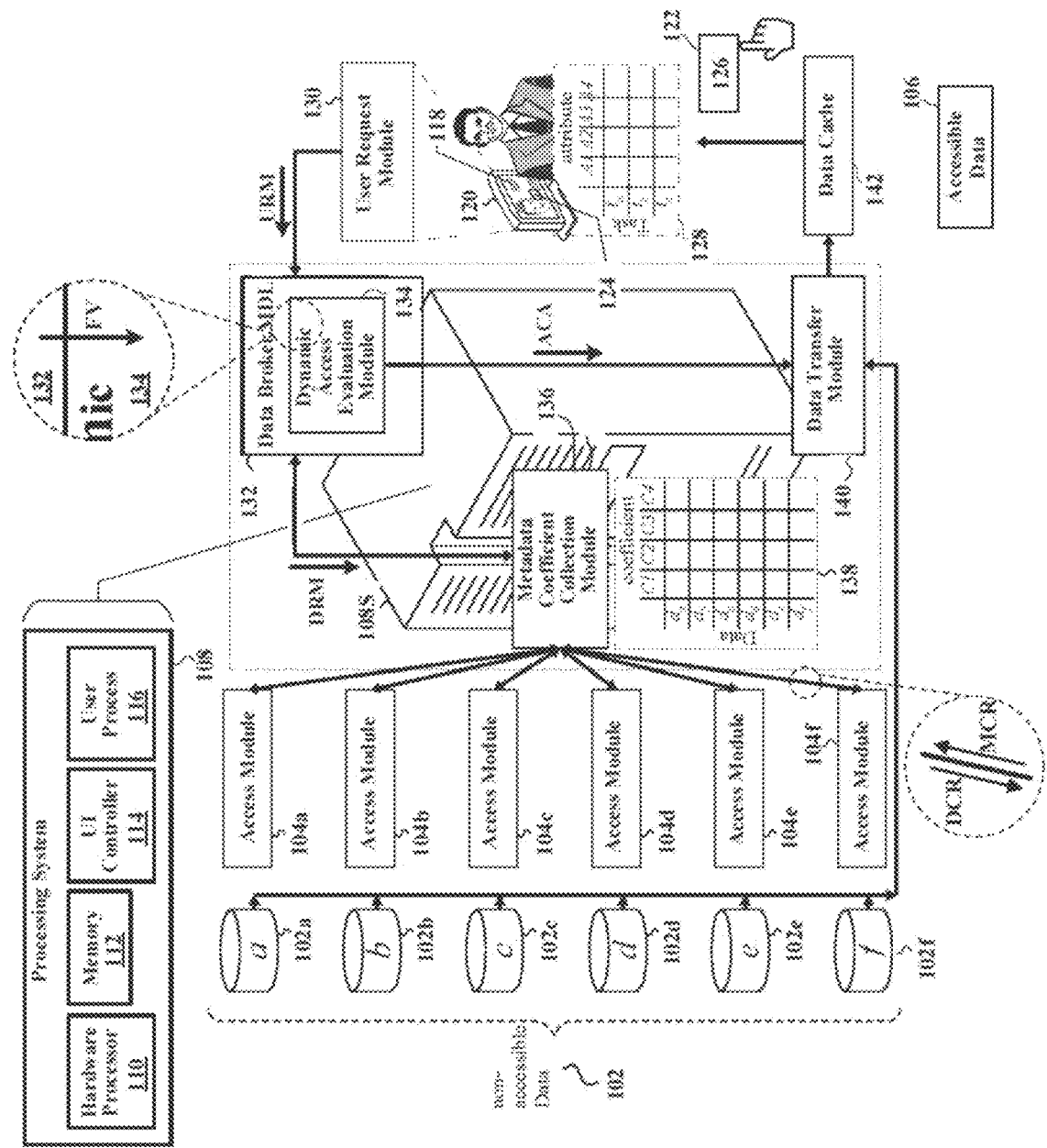
FIG. 1 illustrates, in simplified schematic form, a system for dynamic, risk aggregating construction of tools for task and risk evaluated access to inaccessible data in accordance with various aspects of this disclosure.

The Science and Technology Directorate (S&T), a support component of DHS, is the primary research and development (R&D) arm of the department. To determine where to dedicate R&D investments, an enterprise as large as DHS must look toward the enterprise's core missions. The core missions of the DHS enterprise, however, are inherently varied and complex, and can involve competing and complementary platforms, systems, and activities. To support the analysis of these enterprise core missions, the present discussion discloses a system of systems approach to help capture interactions of aspects relating to challenges the enterprise faces.

A system of systems may be a collection of task-oriented, or dedicated systems that pool their resources and capabilities together, creating a new, more complex system with greater functionality and performance than the simple sum of its constituent systems.

System of Systems

An enterprise may identify a capability gap in its ability to conduct mission-oriented analysis at the system of systems level.

Such a gap may be evident in the limitations of the tools used in gap analysis and in an absence of a doctrinal framework for conducting an analysis from a system of systems perspective. For example, where an enterprise is large enough, it is possible for different projects to focus on the same or a similar goal, where overlapping capabilities are sought, but analyzed without regard to each other. Such a situation can lead to duplicated efforts and higher cost, owing in part to a loss of value that may have otherwise been achieved with coordination.

A tool referred to in this discussion as a System of Systems Operational Analytics (referred to hereafter as SoSOA or a SoSOA tool) can be a computer-implemented system or tool that can provide enterprise leaders and decision makers value-added analytics that enable them to understand how multiple systems, platforms, and activities of the enterprise combine to perform its core missions.

In an embodiment, a SoSOA tool can be a virtual environment for collaborative operational analyses to enable complex, timely, mission-focused decisions across an enterprise. A SoSOA tool, according to an embodiment of this disclosure, may support decision-makers by combining selected data, subsidiary tools, and algorithms to enhance analytic capabilities enterprise-wide. A SoSOA tool, in an embodiment, can implement a demonstration project approach to elicit analytic and system requirements, to solve immediate enterprise component problems, and to build to longer-term needs.

A SoSOA tool, in an embodiment, may provide a computer-implemented system that allows analysts to bridge the gap between tactical and strategic decisions. For analysts, SoSOA may provide access to varied data sources and high-powered analytic capabilities to allow predictive to-be analyses showing the operational trade-offs implicit in the future planning of enterprise capabilities and operations. For decision-makers, SoSOA may provide an approach to answer questions about the as-is environment in an interactive, real-time manner, fusing data sources with visualization and analytic tools in a simple interface.

DHS components oversee a host of carefully-managed details. Hundreds of different personalities, tools, teams, and skillsets function behind the scenes to ensure operations run smoothly. In addition, budget planning and logistics factor into setting the tone for quality of personnel and procedures, and may affect morale across the entire enterprise, including first-responders and other field agents.

Analyzing the numerous activities, processes, and operations may be performed by applying a holistic, system of systems approach that captures interactions of various aspects of an operation. SoSOA represents an effort to streamline or improve analytics behind resource investments, budget allocation, capability needs, system tradeoffs, mission effectiveness, and better ways to track personnel and technology across the enterprise.

Without a SoSOA tool, component chief information officers (CIOs) within the enterprise may have, at times, had to manually integrate the information needed to evaluate different aspects of their operations, the information coming from different sources, in varying qualities. Using a manual approach may be labor-intensive and might not achieve more than a fragmented analytical view.

SoSOA may provide CIOs a tool that allows decision makers to work from an organized rendering of the information coming from their different analysts and officers.

A SoSOA tool, in an enterprise environment, may efficiently meet analysis and decision-making needs across the enterprise. SoSOA seeks to maximize DHS data sources, to use agile modeling and analytics to shorten analysis cycle time, among others, and to reduce resource and personnel needs. SoSOA modeling, analytic tools, and methodologies, used with organization-specific datasets, can trim costs and save time.

Federal Emergency Management Agency (FEMA) and Customs and Border Protection (CBP) are DHS operational components with very different missions. FEMA, among other missions, manages and provides various types of assistance to people during and after disasters, among other missions, works to protect our national borders. Although the missions differ, both represent opportunities for the use of a SoSOA approach to improve the analytic capability of complex systems and processes for better-informed decision-making, as described in greater detail below.

Although the SoSOA tool will significantly enhance the analytic capabilities of an enterprise, achieving the goal of better, data-driven investment decisions and operational decisions requires convenient but controlled access to data. In fact, controlled access to data is a critical factor in SoSOA use and acceptance. The disclosure below describes how reliable automated approval and/or denial of data access can be performed, for example, by an innovative dynamic access evaluation process (DAE). Implementations of the DAE in accordance with this disclosure can feature, for example, receipt of parameters characterizing a task to be performed, e.g., to evaluate a geographic area for specified facts and/or activities and consideration of attributes related to the data requestor(s) themselves. In other words, attributes of both the task and user must be considered in determination of data access. Along with the nature and source of a task to be performed, the DAE process can adjudicate aspects of the data (e.g., sensitivity, privacy, security clearance, etc.) to be accessed for a SoSOA task. The DAE process may be employed in any enterprise where data access must be reliably controlled.

Dynamic Access Evaluation

Dynamic access evaluation as described in this disclosure can automatically and reliably determine data access eligibility, using an algorithmic weighing of metadata coefficients (reflecting various disclosure and sensitivity factors for currently restricted-access data files a user wishes to access) against a plurality of attributes of the particular task for which the user needs the file content. Combinations of these and other features can enable and provide ready use of dynamic evaluation-based tools for accessing restricted-access data files that can be associated with multiple systems belonging to diverse independent external entities. The data access evaluation can be situationally dynamic, i.e., per task, per data file, and per-user. Implementations can include access modules configured to maintain for each of one or more restricted-access data files a set of metadata coefficients. The metadata coefficients can indicate, without limitation, a variety of risk factors associated with disclosure of the file contents upon a receiving, e.g., input data identifying attributes of the task for which access to the restricted-access data is being requested. The input data, which for purposes of description will be referred to as "task attributes," can include attributes of the user, e.g., authorization level, organization, position, etc. Also, through various features and options, e.g., graphical user interface (GUI) display, the user can be presented with suggestions of restricted-access data files that may pertain to the task. Upon selection, e.g., by the system or by the user, or both, of one or more of the restricted-access data files, the system can request from the respective access modules of each of the requested restricted-access data files, the data files' metadata coefficients. System features, upon receiving the metadata coefficients information, can process and structure the metadata coefficients information and the task-user attribute information into compatible forms for weighing and evaluation. In certain situations, one or more of the metadata coefficients, and in some applications one or more of the task-user attributes can be non-binary, allowing higher granularity for data access evaluation.

Task-Attribute Matrix

As described above, SoSOA instantiations can receive, as input data, task-user attributes of the task for which access to the restricted-access data is being requested. The task-user attributes can also include attributes of the user, e.g., authorization level, etc. In an implementation the task-user attributes can be referenced with the form "Ai", where "i" is an index number of the attribute. The system can construct a matrix, having a corresponding set of task-user attributes for each task among a plurality of tasks. The matrix will be referenced, for purposes of description, as "task-attribute matrix."

For example, creation of a task-attribute matrix can include receiving, e.g., via user inputs, a set of four task attributes for a task. The example task-user attributes can be referenced as a first task-user attribute $A_1$, a second task-user attribute $A_2$, a third task-user attribute $A_3$, and a fourth task-user attribute $A_4$. One example first task-user attribute $A_1$ can represent the urgency of a task, e.g., or how close until a deadline. An example second task attribute $A_2$ can represent the position of the task requester, for example, in an organizational hierarchy. One example third task attribute $A_3$ can represent the impact a task may have on the enterprise, and an example fourth task attribute $A_4$ can represent the criticality of the task, for example, to a mission.

Table 1 shows a notional representation of a task-user attribute matrix that carries, for each of the above example three tasks, the example four task attributes.

TABLE 1

Notional Task-User Attribute Matrix

| Task | Attribute | | | |
|------|-----------|---|---|---|
|      | $A_1$ | $A_2$ | $A_3$ | $A_4$ |
| $t_a$ | | | | |
| $t_b$ | | | | |
| $t_c$ | | | | |

Both the quantity and the kind of information carried by the above-described task-user attributes are notional examples. The task-user attributes may be more or fewer in number. In a general aspect, a task may have any arbitrary number n of task attributes, where n is at least two.

Metadata Matrix

As described above, in a SoSOA instantiation each restricted-access data file can be served or supported by an access module containing metadata coefficients pertaining to that particular restricted-access data file. One metadata coefficient, for example, may indicate the file structure. Another metadata coefficient can indicate risk factors associated with disclosure of the file contents. The access module can be provided and/or maintained by the entity exercising authority or control over access to the restricted-access data file.

Another metadata coefficient can indicate or represent privacy-related nature, e.g., personally identifiable information (PII) nature, of the data. The name of a person, for example, may be privacy-related. Other example privacy-related data may include address information, background information such as educational level or source and type of educational degree earned.

Table 2 below is a notional matrix representation of coefficient metadata values. For purposes of description the matrix representation will be referred to as a "data-to coefficient metadata matrix." The Table 2 example matrix, for purposes of example, contains six data file instances, for example, the metadata coefficients $C_1$, $C_2$, $C_3$, and $C_4$ may relate to combinability, privacy, sensitivity, and security classification. The data indicators $d_a$, $d_b$, $d_c$, $d_d$, $d_e$, and $d_f$ may indicate six individual data files in their entirety, particular tables within a given file, particular columns within a given table, and so on.

TABLE 2

Notional Data-Coefficient Matrix

| Data | Coefficient | | | |
|------|-------------|---|---|---|
|      | $C_1$ | $C_2$ | $C_3$ | $C_4$ |
| $d_a$ | | | | |
| $d_b$ | | | | |
| $d_c$ | | | | |
| $d_d$ | | | | |
| $d_e$ | | | | |
| $d_f$ | | | | |

Some privacy-related information in a data file may be more critical to privacy than other privacy-related information. For example, the first name of a person might not be as critical to privacy as the last name of the same person. The home address of a person might be even more critically related to privacy than the first or last names of the person. A particularly critical privacy related data element is a person's social security number, perhaps more sensitive than the home address.

As pointed out above, a privacy related metadata coefficient can represent degrees of difference to be when representing the criticality to privacy of different instances of privacy-related data. In some cases, as will be understood upon reading this disclosure in its entirety, these metadata coefficients can be used to determine data access.

One or more systems in accordance with this disclosure can include, among other features, metadata coefficients that reflect various non-binary degrees (e.g., multiple levels) of quality and of relative privacy-sensitivity impact. These features can provide finer granularity, e.g., and without limitation, in setting optimization points in the dynamic access evaluation process.

In one or more system instantiations, if a restricted-access data file contains privacy-related data, the data file may be assigned a value in its coefficient metadata to indicate the degree to which the data in the data file is privacy-related. For example, where the data file has no privacy-related information, the value of the coefficient for privacy-relatedness, stored as coefficient metadata, may be zero. Where the data file has only a first name of a person or first names of people, the value of the coefficient for privacy-relatedness may be some larger value. A data file having a last name, but no first name, may be assigned an even larger a privacy-related coefficient. A data file with first name, last name, home address, and social security number may be assigned a still-larger privacy-related coefficient value. It will be understood that the above-identified relative values and data file contents are arbitrary examples that are not intended as any limitation on practices according to this disclosure. Also, in implementations of one or more embodiments, arithmetic values of the metadata coefficients may be normalized, e.g., scaled for computational purposes.

Cumulative Risk Aggregation

SoSOA embodiments can provide dynamic access evaluation that can also weigh added risks, if any, that may arise when combining a requested presently restricted-access data element with data accessed through a previous request and associated dynamic access evaluation process. Implementations can provide a cumulative risk aggregation logic, and the logic can be configured with storage or other access to record and indicate metadata coefficients corresponding to the combined total of now-accessible data.

Implementations of the cumulative metadata coefficient logic can be configured, for example, to carry information from a plurality of previous sets of second values, the previous sets of second values being associated with previously restricted-access but now-accessible data files obtained through previous access requests. For example, an implementation can carry the information as an accumulated metadata coefficient matrix. In an example alternative, the cumulative risk aggregation logic can store, for one or more once restricted-access data files accessed through previous access requests, the respective metadata coefficient matrix values. Further to the cumulative risk aggregation, the access evaluation module can be configured to perform dynamic access evaluation based at least in part on the first values corresponding to a present set of task-user attributes, second values corresponding to metadata coefficient values for the currently restricted-access data files to which access is request, in further combination with the cumulative information from the plurality of previous sets of second values. Implementations, in other words, can include the dynamic access evaluation logic being configured base evaluation for approval or non-approval of access to a restricted-access data file on, for example: the current task-user attribute values, the presently restricted-access data file metadata coefficient values, and data representing, based on, or reflecting metadata coefficients for the total set of now-accessible data files.

Data Catalog

In some SoSOA instantiations, a catalog logic can be configured to store—e.g., in in the memory resource—a catalog description of data. The catalog description can include indication of the data being accessible or restricted-access. Implementations can of the catalog logic can be configured to display, e.g., on the GUI, representations of the data descriptions, e.g., as text, or graphics, or both. The catalog logic can be configured to perform an updating of the catalog description, for example, in association with system grant of access authorization, as described in greater detail later in this disclosure.

Drag and Drop

In one or more SoSOA instantiations, system features may include display of icons representing data files. These features can include one or more mechanisms for quick identification, e.g., by hovering a cursor, of data file contents and file characterizations. System features can also include display of tasks, and a click-on selection and dragging of the selected data blocks onto a task for which access to the data file is requested. Features can also include coupling task blocks to user-entered task-user attributes. Dynamic access evaluation can be performed in the background and in real-time, concurrent with the click-and-drag feature. This feature, in association with the real-time dynamic access evaluation, can include an immediate graphic notification of access approval or non-approval.

Example Application

A user within an enterprise can be assigned a task, e.g., an investigative task, requiring rapid access and collection of certain kinds and qualities of data. The user can through a GUI gain the required access in accordance with aspects of this disclosure. The access point includes a GUI coupled to a processing logic configured to provide, among other features, interface to access modules for the restricted-access data files containing the needed data. The GUI can present graphical representations of the restricted-access data files, which cancan include indications, e.g., a color code scheme indicating whether the data is, or is not accessible. The user inputs task-user attributes to the GUI. The system, based on the user inputs, generates a task-user attribute matrix. The system provides the task-user attribute matrix to a dynamic evaluation module and sends a query to the access modules associated with the needed restricted-access data files. The access modules respond with the metadata coefficients, which are received by a metadata coefficient collection module that, in turn, can construct a metadata coefficient matrix. The metadata coefficient collection module provides the constructed metadata coefficient matrix, or a data from same, to the dynamic evaluation module. The dynamic evaluation module performs the evaluation to determine whether the access is granted or denied.

FIG. 1 illustrates, in simplified schematic form, a data access system 100 (hereinafter "system 100") for dynamic, risk aggregating construction of tools for task and risk evaluated access to remote, independent system managed restricted-access data in accordance with various aspects of this disclosure.

For purposes of example, description of system 100 assumes an arbitrarily selected number of six restricted-access data files, shown as restricted-access data files 102a through 102f For discussion purposes, the example restricted-access data files will be referenced collectively as "restricted-access data files 102x.

It should be noted that the selection of six data files is only an example. It is not intended as a limitation on the scope of practices according to this disclosure. As will be appreciated upon reading this disclosure in its entirety, there can be dynamic evaluation of task-user access to many (e.g., tens or hundreds) remote, independent system-managed restricted-access data files. Practices contemplated in accordance with this disclosure also include dynamic, risk aggregating construction of tools for task and risk evaluated access to a single data file, e.g., only one restricted-access data file in the set of 102x. Also, as will be understood upon reading this disclosure in its entirety, the number of restricted-access data files composing the 102x set of data files may vary over time. Thus, new restricted-access data files may be added to the set and, at given times, current restricted-access data files can be removed.

It will be understood that the relative positioning and arrangement on the FIG. 1 schematic drawing of blocks representing restricted-access data file set 102x is based on drafting convenience, and is not a description, specification, or indication of limitation regarding physical location or distribution of data storage files accessible through SoSOA given appropriate task-user attributes and data file metadata.

In accordance with disclosed concepts and aspects thereof, system 100 can include a storage and management of metadata coefficients for each of the restricted-access data files 102x. In the FIG. 1 example, such storage and managements are provided by six separate access modules 104x, where x=1 to 6, one for each of the restricted-access data files 102x. The one access module 104x per restricted-access data file 102x configuration is only one notional example. Additional example configurations are described in greater detail in later paragraphs. For each of the restricted-access data files 102x, the respective set of metadata coefficients can include, as described above, data file structure metadata coefficients and various types of data sensitivity metadata coefficients. Representative types of data sensitivity metadata coefficients can—at the discretion of the entity controlling the data file—include, but are not limited to, privacy metadata coefficients, security classification metadata coefficients, combinability-type metadata coefficients, law enforcement metadata coefficients, and so forth.

As described above, the FIG. 1 example correspondence of access modules 104x to restricted-access data files 102x is one-for-one. A first access module 104a is shown associated with the first restricted-access data file 102a, second access module 104b with the second restricted-access data file 102b, third access module 104c with the third restricted-access data file 102c, fourth access module 104d with the fourth restricted-access data file 102d, fifth access module 104e with the fifth restricted-access data file 102e, and sixth access module 104f with the sixth restricted-access data file 102f. Benefits of assigning each restricted-access data file 102x a particular access module 104x can include, but are not limited to, the assigned access module 104x being tailored to the particular data file address of the restricted-access data file 102x. However, one access module 104x per restricted-access data file 102x is only an example and is not intended any limit on practices according to this disclosure. For example, one alternative can include configuring one access module 104x to manage access to two or more restricted-access data files 102x, or even manage access to all restricted-access data files 102x as long as the metadata coefficients of all six data files comprising 102x are consistent with one another.

FIG. 1 shows an example environment that includes accessible data files 106. The accessible data files 106 can include, for example, files previously included the restricted-access data files 102x having been accessed, through described data access control features and operations of system 100. In an implementation described in greater detail, for example in reference to FIGS. 3 and 4, there exists an accumulated metadata matrix associated with all accessible data files 106. The accumulated metadata matrix carries information for weighing risks in combining new restricted-access data files with information already accessible to the user—and to others of at least the same access authorization level.

The system 100 can include a processing system 108, which can include a hardware processor 110, a memory 112, and a user interface controller 114 (labeled "UI Controller" on FIG. 1), which can be communicatively connected to one another. The processing system 108 can include processing resources, for example, a server resource such as the example 108S. The processing system 108 can also be a resource of, for example, the server 108S The hardware processor 110 can be configured to perform a predefined set of basic operations, in response to corresponding basic instructions from a predefined set of native instruction codes. The hardware processor 110 can be configured via a set of machine codes, which can be selected from the predefined native instruction set of its codes and stored, for example, in the memory 112. The machine codes can include modules implementing a particular application, for example, a user process 116 configured with functions implementing a graphical user interface (GUI) 118. Graphic display features of the GUI 118 can be provided, for example, by a display device 120. User input functionality of the GUI 118 can be provided, for example, by a user input device 122. In one example implementation, the display device 120 and user input device 122 can be merged into a touchscreen device. The user input device 122 can also be implemented by multiple devices, for example, a keypad, a trackpad, or a mouse, or any combination thereof, further combined with graphic display features of the GUI 118, e.g., display of a mouse cursor, display user input text, and the like. The user input device 122 can also include a card reader, enabling the user to enter, for example, user attributes by inserting a secure card.

The GUI 118 can be configured to accept a data indicator 124 that can indicate, e.g., a data file from among the restricted-access data 102 and, in an aspect, data from among the local accessible data 106.

The GUI 118 can be adapted to receive user inputs 126, for example, via the user input device 122. The user inputs 126 can relate to tasks, attributes of the tasks, and attributes of a user, such as described above in reference task-user attributes $A_1$, $A_2$, $A_3$, and $A_4$. The user process 116 can be further configured to determine a task-user attribute matrix 128 containing first values, based on the user input 126. The task-user attribute matrix 128 can be of a form as represented notionally in Table 1. The processing system 110 can include, for example, through features of the user process 116, a user request module 130 that can be configured to output a user request message (labeled "URM" on FIG. 1) containing task-user attribute matrix 128 first values and the restricted-access data indicator.

The processing system 108 can include a data broker module 132 that can be configured to receive the user request message and, in response, provide the first values (labeled "FV" on FIG. 1) from the task-user attribute matrix 128 to a dynamic access evaluation module 134 and to output a data request message (labeled "DRM" on FIG. 1) containing the restricted-access data indicator.

In an aspect, the processing system 108 can include a metadata coefficient collection module 136 that can be configured to receive the data request message and, in response, output a data-coefficient request message (labeled "DCR" on FIG. 1) to one or more of the access modules 104x. The metadata coefficient collection module 136 can selectively direct the data-coefficient request message to the specified access modules 104x based, at least in part, on the restricted-access data indicator. The access modules 104x can be configured to respond to receipt of the data-coefficient request message by sending a metadata coefficient reply message (labeled "MCR" on FIG. 1). The access modules 104x can be configured to include, in the metadata coefficient reply message, second values representing or indicating values of the metadata coefficients of the associated restricted-access data file 102x. The metadata coefficients represented or indicated by the second values can include, in an example implementation, at least a sensitivity metadata coefficient, a privacy metadata coefficient, a combinability metadata coefficient, and a security metadata coefficient.

The metadata coefficient collection module 136 can be configured to respond to receiving the metadata coefficient reply message from the one or more access modules 104x, by determining a metadata coefficient matrix 138, using the second values pertaining to the restricted-access data file. The metadata coefficient matrix 138 can be in accordance, for example, with the Table 2 notional metadata coefficient matrix described above. In one or more implementations, the metadata coefficient collection module 136 can be further configured to output the second values, from the metadata coefficient matrix 138, to the dynamic access evaluation module 134. The dynamic access evaluation module 134 can be correspondingly configured to perform, upon receipt of the second values from the metadata coefficient matrix 138, a dynamic access evaluation based on the first values and second values.

The dynamic access evaluation module 134 can be configured to output, upon a positive determination by the dynamic access evaluation, an access authorization message (labeled "ACA" on FIG. 1), pertaining to the restricted-access data file(s). A data transfer module 140 can be configured to respond, upon receipt of the access authorization message, by providing the previously restricted-access data to a data cache 142. The data cache 142 can be associated with the memory 112, or otherwise configured such that the now accessible data can be available to the user process 116.

Figure 2:
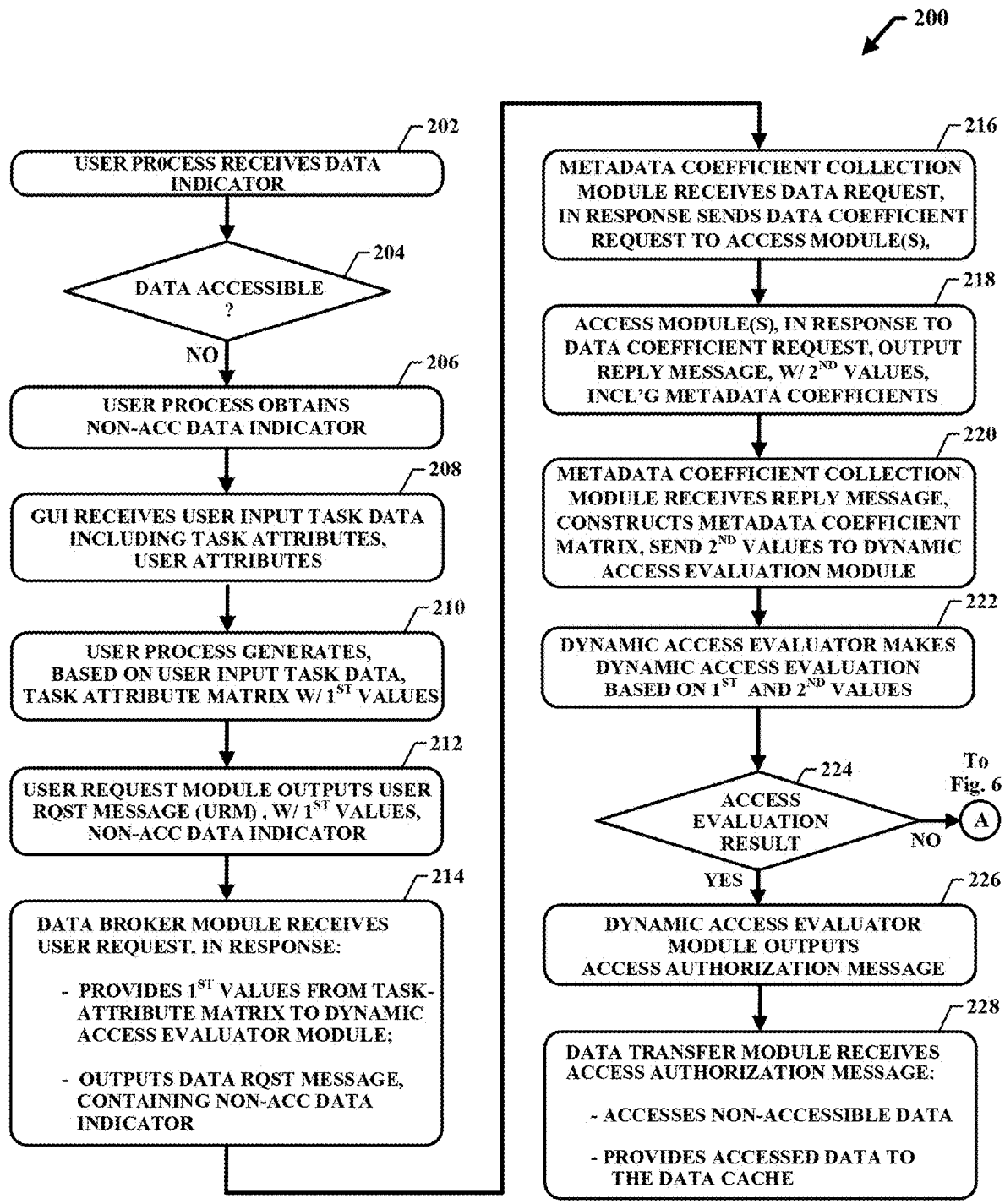
FIG. 2 illustrates a logic flow of operations in a process in a dynamic, risk aggregating construction of one or more tools for task and risk evaluated access to remote, independent system managed inaccessible data, in accordance with various aspects of this disclosure.

FIG. 2 illustrates a logic flow depiction of a process 200 for dynamic risk aggregation involving one or more tools for determining task- and risk-evaluated access eligibility to remote, independent system managed restricted-access data files, in accordance with various aspects of this disclosure. In an example instance, processing can proceed from receiving 202 a data indicator, e.g., at the FIG. 1 GUI 118, to accessibility determining 204, where the user process 116 can determine whether or not the data reflected by the data indicator is accessible. Upon a negative result of the accessibility determining 204, i.e., determining the data is not accessible, the process can proceed to obtaining 206 a restricted-access data indicator, and then to task-user attribute receiving 208, where the GUI can receive user input of task-user attributes, for example, on the user input device 122. Processing can proceed to task-user attribute matrix generation 210 where, for example, the user process 116 can generate, based on user input task-user attributes, task-user attribute matrix first values. Processing can proceed to request messaging 212 where user request module 130 can output user request message with first values and restricted-access data indicator.

Processing can proceed to request message receiving and data request message sending 214 where the data broker module 132 can receive the user request message and provide first values from the task-user attribute matrix 128 to the dynamic access evaluation module 134, and output the data request message, with the restricted-access data indicator. Upon the metadata coefficient collection module 136 receiving the data request message, metadata coefficient requesting 216 can output a data coefficient request to access modules 104x. Processing can then proceed to coefficient reply messaging 218 where access modules 104x, in response to data coefficient request message, can output coefficient reply message, with second values, including metadata coefficients.

Referring to FIG. 2, upon the metadata coefficient collection module 136 receiving the coefficient reply message, metadata coefficient matrix determining and sending 220 can form the metadata coefficient matrix 138 and provide second values from the metadata coefficient matrix 138 to the dynamic access evaluation module 134. Processing can proceed from metadata coefficient matrix determining and sending 220 to dynamic evaluating 222, and then to decision 224. The decision 224, in response to a positive result of the dynamic evaluating 222, causes processing to proceed to dynamic authorization massaging 226 where, for example, the dynamic access evaluation module 134 can send the access authorization message to the data transfer module 140. Processing can proceed from dynamic authorization massaging 226 to data transferring 228, an example of which can be the data transfer module 140 accessing the previously restricted-access data and delivering the data to the data cache 142.

Embodiments can include an adaptation of the system 100 that includes a cumulative risk aggregation logic, configured to carry information from a plurality of previous sets of second values, associated with previously restricted-access data that is currently accessible through previous accessing in accordance with this disclosure, e.g., based on previous data access authorization messages. The embodiments can further include a modification or adaptation of the FIG. 1 dynamic access evaluation module 134, further configured to perform the dynamic access evaluation based at least in part on a combination of the first values, the second values, the information from the plurality of previous sets of second values.

Figure 3:
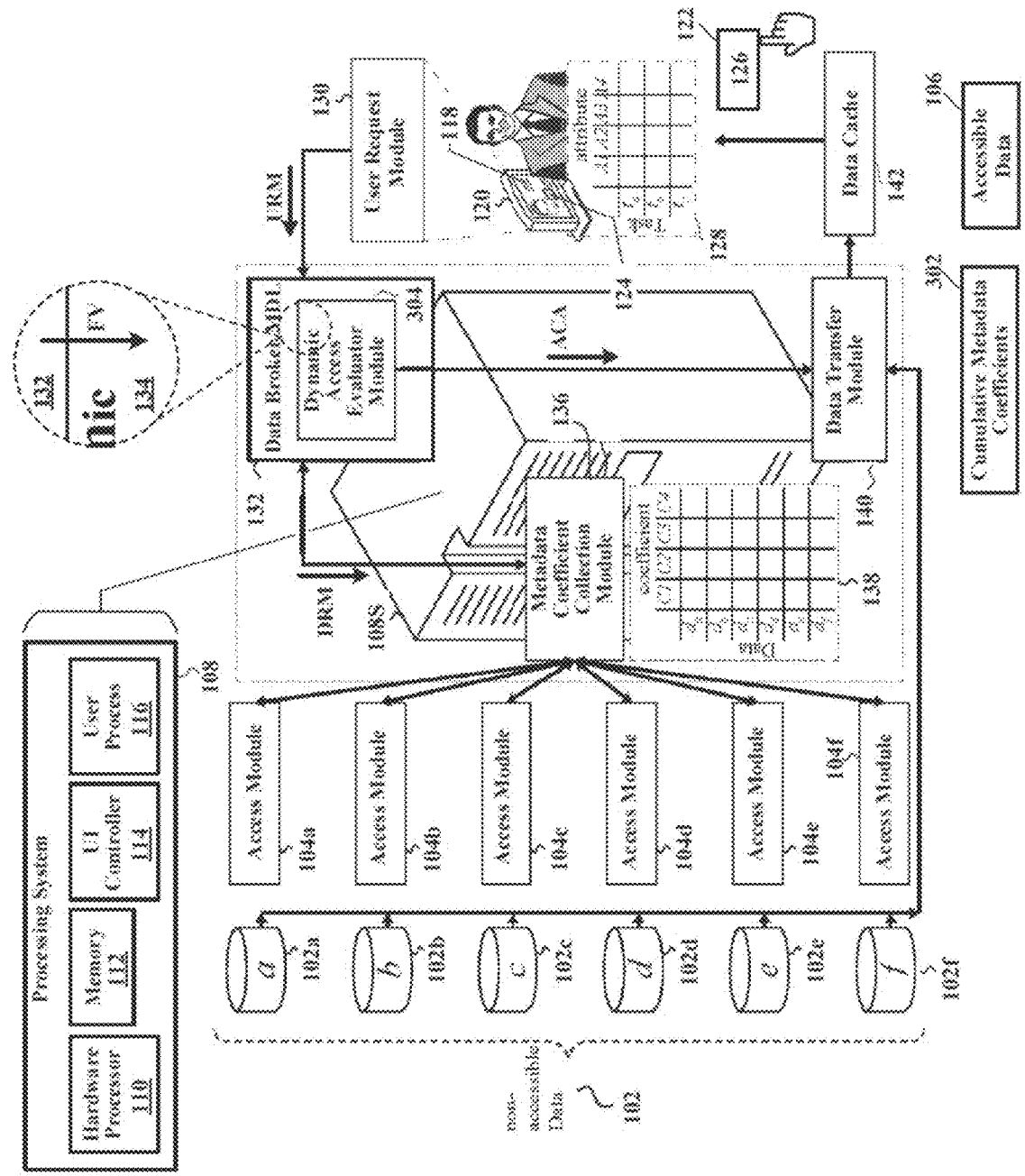
FIG. 3 illustrates, in simplified schematic form, an alternative system in accordance with aspects of this disclosure, including cumulative metadata coefficient logic, and a corresponding adapted dynamic evaluation module.

FIG. 3 illustrates, in simplified schematic form, a system 300 of another embodiment in accordance with this disclosure. The FIG. 3 implementation of system 300 carries features of the FIG. 1 system 100, in combination with a cumulative metadata coefficient logic 302, and a corresponding adapted dynamic evaluation module 304. Features of the adapted dynamic evaluation module 304, in the context of operations determining whether to grant or deny access authorization for a present request, can include applying the FIG. 1 dynamic access evaluation module 134 weighting to the present first values from the task-user attribute matrix 128 and the present second values from the metadata coefficient matrix 138, in addition to weighting or otherwise considering cumulative metadata coefficient values from the cumulative metadata coefficient logic 302.

Figure 4:
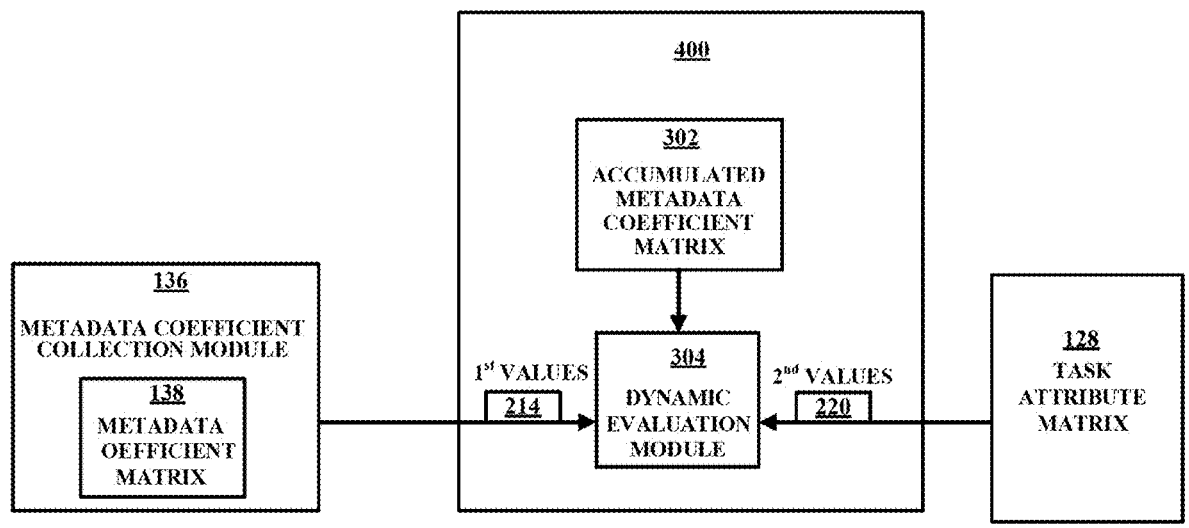
FIG. 4 illustrates a logic flow of operations in an adaptation of the FIG. 2 process, providing further risk aggregating, dynamic evaluation using a cumulative metadata coefficient aspect such as the illustrated in FIG. 3, in accordance with various aspects of this disclosure.

FIG. 4 illustrates, in simplified schematic form, a supplemented cumulative metadata evaluation feature 400 formed by the cumulative metadata coefficient logic 302 and adapted dynamic evaluation module 304. The FIG. 4 schematic also illustrates reception by the adapted dynamic evaluation module 304 of second values from the metadata coefficient matrix 138 and first values from the task-user attribute matrix 128. For purposes of description, certain blocks from the FIG. 2 process 200 are shown superposed on FIG. 4.

Referring to FIGS. 2, 3, and 4, a process of cumulative evaluation supplements the following modification of the FIG. 2 process 200 to perform process steps 202 through 212, then to process a modified data request message sending 214—the modification being communication of the task-user attribute matrix first values to the adapted dynamic evaluation module 304—instead of the FIG. 1 dynamic access evaluation module 134. From the modified data request message sending 214 proceed to metadata coefficient requesting 216, then to coefficient reply messaging 218 as described above, and then proceed to a modified sending 220—the modification being a supplying of the metadata coefficient matrix 138 second values to the adapted dynamic evaluation module 304 instead of the FIG. 1 dynamic access evaluation module 134. From the modified sending 220 proceed to a modified dynamic evaluating 222. The modification to dynamic evaluating 222 includes application and weighting—and other data access consideration algorithms—to the combined first values and second values of the current data access request to the cumulative metadata coefficient values provided by the cumulative metadata coefficients logic 302. From the modified dynamic evaluating 222 proceed to step 224 as described above in reference to FIG. 2.

In addition to the process described above, in association with authorization of access, i.e., a positive response at the modified process 200 decision 224 (labeled "YES" on FIG. 2), the system 300 can update the cumulative metadata coefficient logic 302 with the applied second values from the metadata coefficient matrix 138.

In one or more implementations of the FIG. 3 system, the cumulative metadata coefficient logic 302 can be configured to carry, for each of a number of previous access authorization grants, the metadata coefficient matrix second values that were considered in the granting of the access authorization. For example, assuming four previous grants of access authorization, the described configuration of the cumulative metadata coefficient logic 302 would carry four sets of metadata coefficient matrix second values, one for each of the previous grants. Storage of the previous metadata coefficient matrix second values can be arranged as a metadata coefficient matrix record or database.

A hypothetical scenario illustrative of certain features provided by the cumulative metadata coefficient logic 302 and adapted dynamic evaluation module 304—in combination with the metadata coefficient matrix record or database—is as follows: assume a particular sensitivity in one now-accessible data file. Considered in the context of the task for which the access to the now accessible data file was granted, the adapted dynamic evaluation module 304 granted the access. However, when the previously considered sensitivity is combined with another specific sensitivity of a presently restricted-access data file, there may be significantly higher risk of unauthorized distribution of the now restricted-access data file. The adapted dynamic evaluation module 304, being provided through this implementation with the second values from the present restricted-access data file and also provided—via the metadata coefficient matrix record or database—with particular sensitivity in the now-accessible data, observes the significant increase in risk resulting from the combination of currently requested data file with previously accessed data files.

Above-described examples of evaluating task-user attributes and metadata coefficients produced positive evaluation results, i.e., the dynamic access evaluation module 134 granted or authorized the requested access to the restricted-access data. However, in practices according to this disclosure scenarios may occur where the dynamic evaluation shows that risks of unauthorized distribution of the subject data may outweigh task factors, e.g., priority, represented by the task-user attributes. The evaluation result in this scenario, as described above, is the negative result. Implementations can include a logic, e.g., an adaptation or supplementation of the dynamic access evaluation module 134, that can provide in response to the negative result a flag or other indication of a negative response to the access request. The flag or other indication of negative response can be configured, for example, to present as an access request denied message.

The dynamic access evaluation module 134 can be configured to generate a report upon its determination of a negative result from the dynamic access evaluation or upon detecting that the result will be negative. For purposes of description, the report will be referenced as an "access evaluation negative" report.

Figure 5:
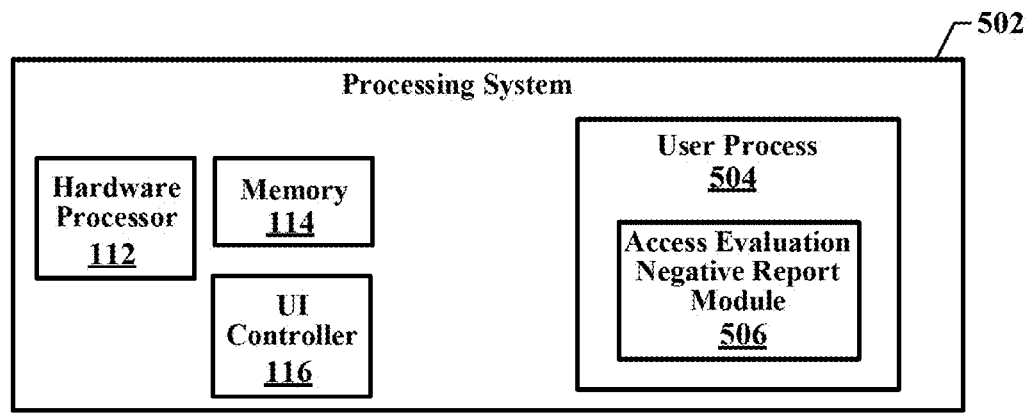
FIG. 5 illustrates, in simplified schematic form, an embodiment providing access evaluation negative reporting.

FIG. 5 illustrates in simplified schematic form an implementation of an embodiment providing, in association with the above-described events, an access evaluation negative report. The FIG. 5 implementation carries features of system 100 but substitutes a processing system 502 for the processing system 108. The processing system 502 differs from the processing system 108 by including a user process 504 that, in addition to the above-described features of the FIG. 1 user process 116, includes a logic 506 which will generate the access evaluation negative report. For purposes of description the logic 506 will be referred to as "access evaluation negative report module" 506. The access evaluation negative report module 506 can be implemented, for example, as a functionality of the dynamic access evaluation module 134, or as a functionality of the adapted dynamic evaluation module 304.

In a SoSOA instantiation, the access evaluation negative report module 506 can be implemented to detect instances where one or more task-user attributes or one or more metadata coefficients, or both, have or are estimated to have a significance requiring a negative response to the access request. An implementation can configure the access evaluation negative report module 506 to include, in association with the negative determination, an indication of the detected task-user attribute(s) and/or one or more metadata coefficient(s) that resulted in the negative response. Benefits of such configuration, as described above, can include but are not limited to determining a potential remedial action.

Figure 6:
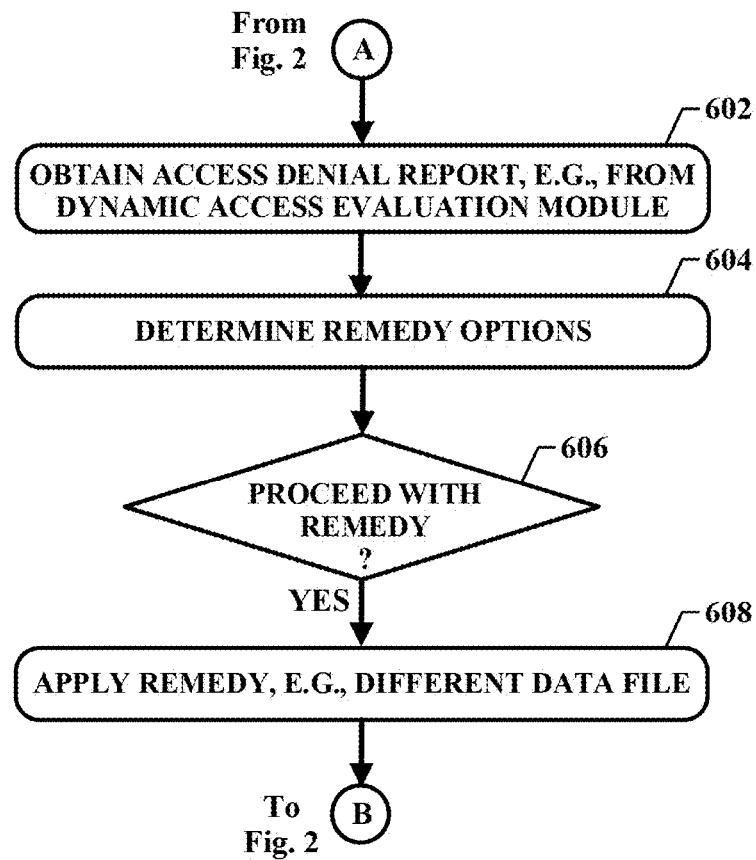
FIG. 6 illustrates a logic flow of a remediation process, through embodiments with access evaluation negative reporting.

FIG. 6 illustrates a logic flow of a remedial action process by embodiments with the above-described access evaluation negative report feature. Referring to FIGS. 2 and 6, the FIG. 6 process can begin with a "NO" by the FIG. 2 decision 224, upon which the process proceeds from jump exit "A" in FIG. 2 to jump entrance "A" on FIG. 6. From the FIG. 6 jump entrance "A" the process can proceed to the obtaining 602 of the access evaluation negative report. The obtaining 602 can be affirmative action, or can be a reception of a report generated, for example, by the FIG. 5 access evaluation negative report module 506. From the obtaining 602 the process can proceed to determining 604 of remedy options. In an implementation, determining 604 can be based, at least in part, on contents of the access evaluation negative report. From the determining 604 the process can proceed to decision 606 of whether to proceed with a remedying action. If the decision 606 is "YES," remedying 608 can be applied.

SoSOA Architecture View

Figure 7:
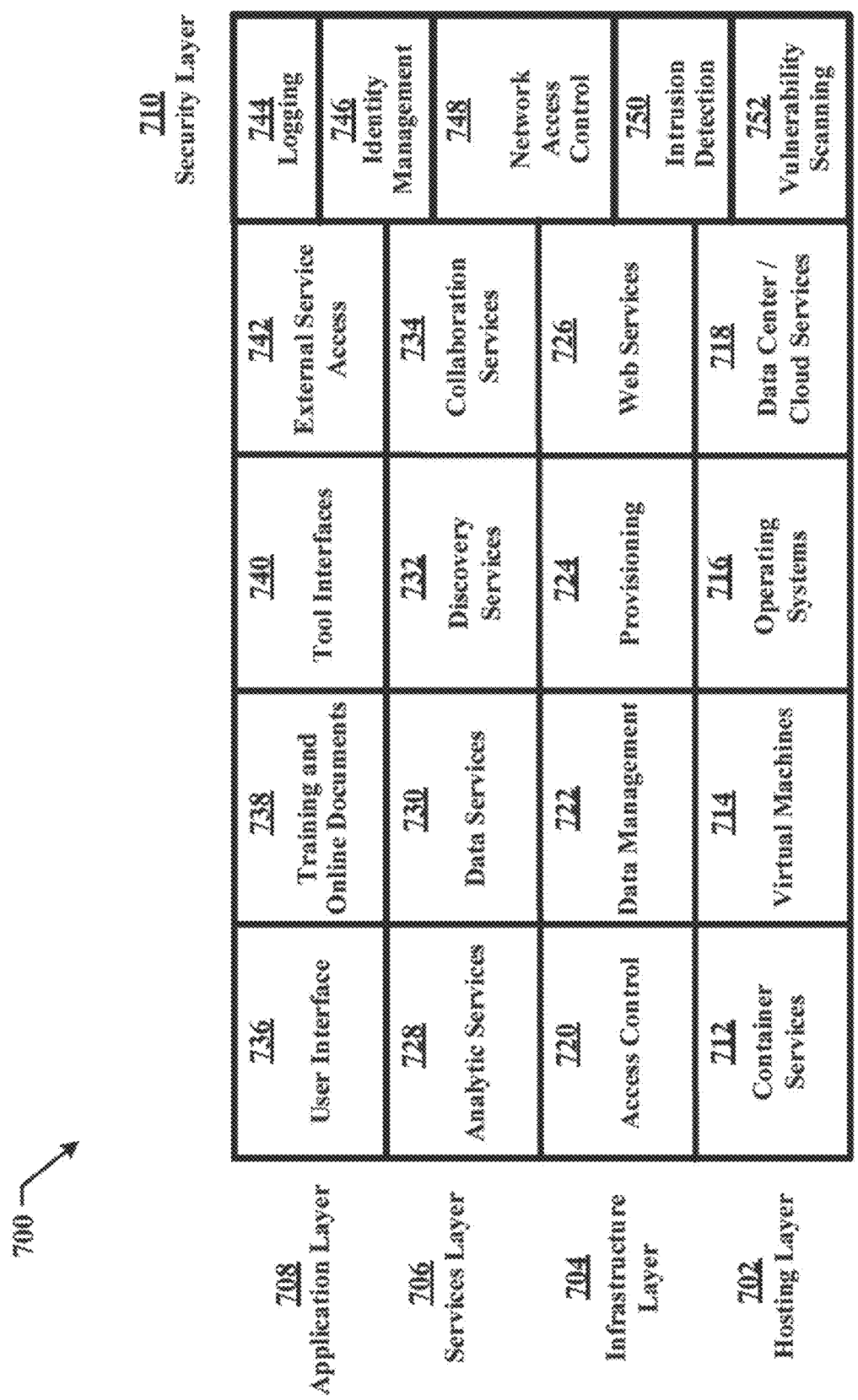
FIG. 7 illustrates, in simplified schematic form, an example architecture in accordance with various aspects of this disclosure, supporting a system of systems operational analytics.

FIG. 7 illustrates, in simplified schematic form, an example architecture in accordance with various aspects of this disclosure, supporting the building of and processes on a system of systems operational analytics. The FIG. 7 architecture features five general layers—a hosting layer 702, an infrastructure layer 704, a services layer 706, and application layer 708 and, spanning these described four layers, a security layer 710.

The hosting layer 702 can support, for example, container services 712, virtual machines 714, operating systems 716, and data center or cloud service 718. The infrastructure layer 704 can support access control 720, data management 722, provisioning 724, and web services 726. In the services layer 706, analytic services 728, data services 730, discovery services 732, and collaboration services 734 are provided. The application layer 708 includes the user interface 736, training and online documents 738, tool interfaces 740, and external service access 742. Crossing all of the foregoing layers is the security layer 710 that implements logging 744, identity management 746, network access control 748, intrusion detection 750, and vulnerability scanning 752.

SoSOA Environment View

Figure 8:
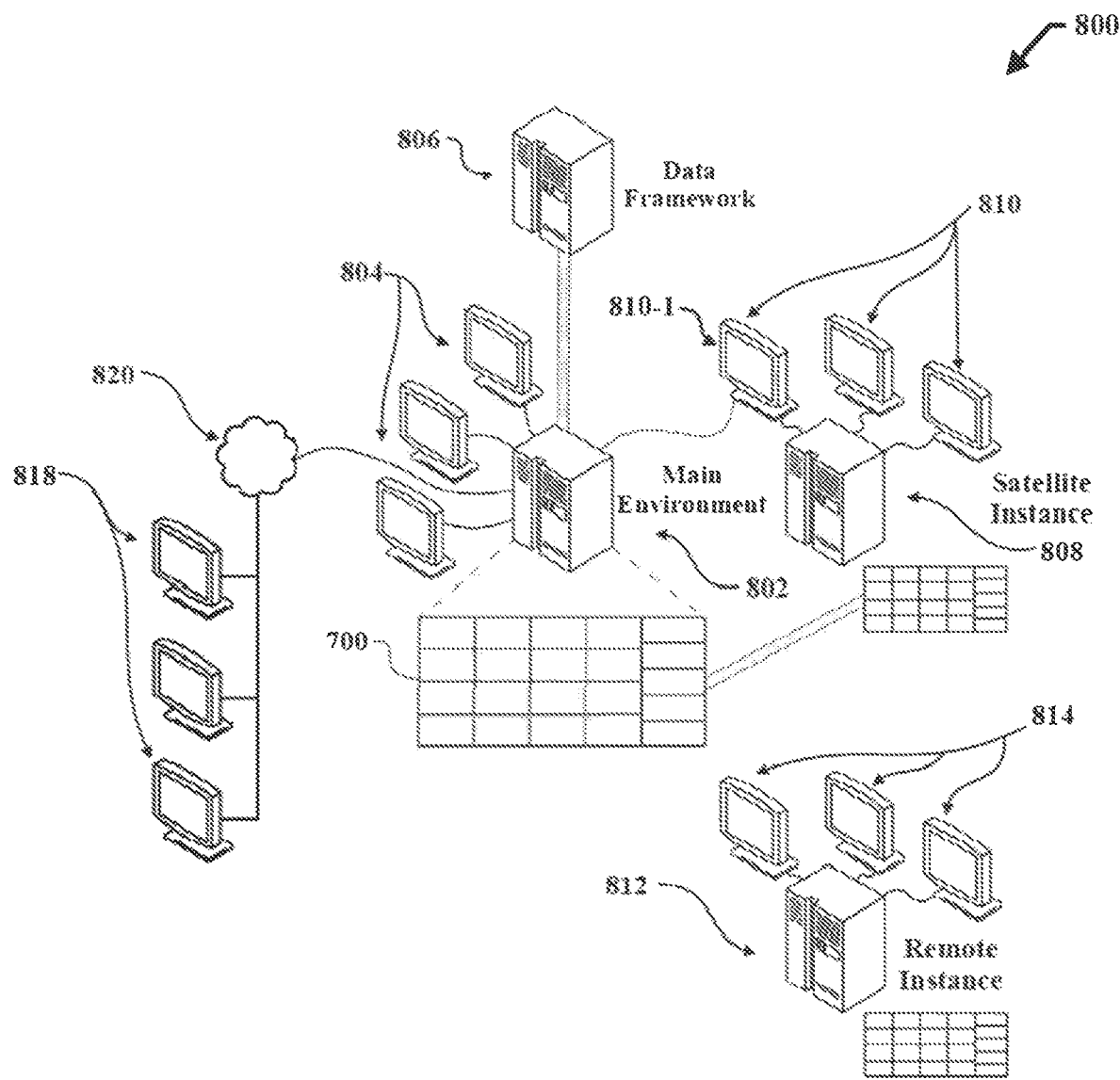
FIG. 8 illustrates, in simplified schematic form, an example implementation environment in accordance with various aspects of this disclosure for system of systems operational analytics.

FIG. 8 illustrates, in simplified schematic form, an example implementation environment 800 in accordance with various aspects of this disclosure for SoSOA. The example implementation environment 800 can include a main environment 802 that has local users 804 who can access an instance of system 100. A given user process which can be a user at any location, is indicated. Also shown in FIG. 8 the implementation environment 800 can include a data framework 806 in communication with the main environment 802, and a satellite instance 808 in communication with the main environment 802 and having local users 810. The environment 800 can also include remote instance 812 with local users 814 but not in communication with the main environment and can include remote users 816 who access the main environment through a network 818 such as the Internet. One user 810-1 local to the satellite instance 808 is illustrated as connecting, through connection 820 to the main environment 802. Features provided by the connection 820 include, for example, an ability for a user who is local to one instance to perform an analysis task at another instance.

SoSOA Data Connections View

Figure 9:
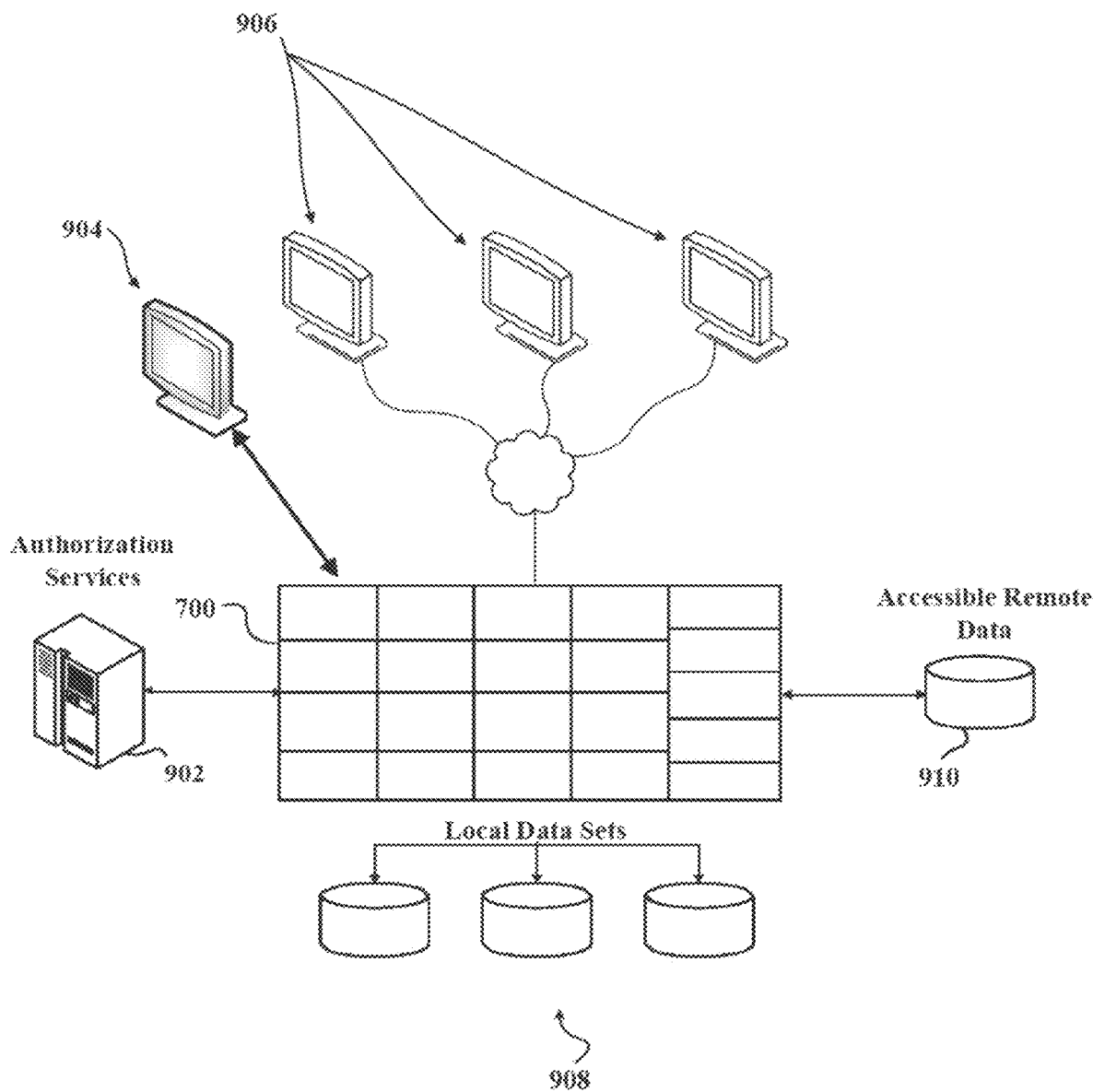
FIG. 9 illustrates, in simplified schematic form, a data connections view in accordance with various aspects of this disclosure, for system of systems operational analytics.

FIG. 9 illustrates, in simplified schematic form, a data connections view 900 in accordance with various aspects of this disclosure, for system of systems operational analytics. An authorization services 902 can receive a system access request and, in response, can apply an authorization process, such as the FIG. 1 that can determine whether the request is from an authorized user. An authorized user can be a local authorized user 904 or can be a remote authorized user 906. Authorization services 902 can be configured to apply a threshold determination of whether users, local or remote, can access data under control of authorization services 902. In Alternatively, authorization services 902, can be configured to permit authorized users to access the system in general. Whether and which local data sets 908 may be accessed by a given user is also handled by authorization services 902. Accessible remote data 910 is data that has been designated as accessible via the system. Whether a user is authorized to access the accessible remote data is governed via authorization services 902

Computer System

Figure 10:
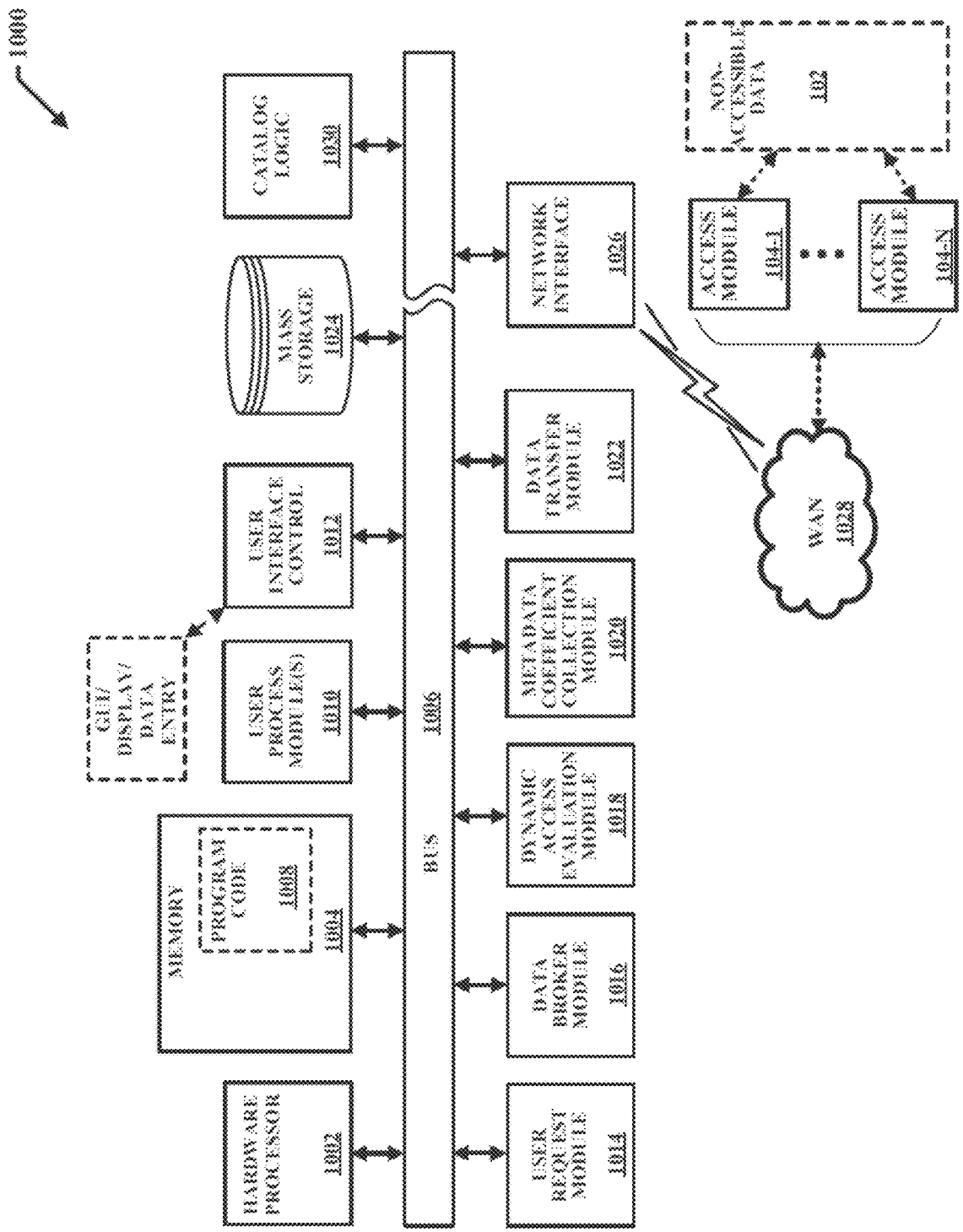
FIG. 10 illustrates, in simplified schematic form, a computing system on which aspects of the present disclosure can be practiced.

FIG. 10 illustrates, in simplified schematic form, a computing system on which aspects of the present disclosure can be practiced. The computer system 1000 can include a hardware processor 1002 communicatively coupled to a memory 1004 by a bus 1006. The memory 1004 can be configured to store, on at least a non-transitory computer readable medium as described in greater detail below, executable program code 1008. The hardware processor 1002 may include multiple hardware processors and/or multiple processor cores. The hardware processor 1002 may include hardware processors from different devices, that cooperate. The computer system 1000 system may execute one or more basic instructions included in the executable program code 1008. The executable program code 1008 can implement logic, which can in turn implement a user process, e.g., in one or more modules, for example the FIG. 10 user process module(s) 1010. The user process module(s) 1010 can implement, with a logic connection to the hardware processor 1002 through the bus 1006, a user interface control 1012, a user request module 1014, a data broker module 1016, and a dynamic access evaluation module 1018.

Referring to FIGS. 1 and 10, the user process module(s) 1010 can be configured in accordance with user process 116, and can therefore implement, for example, a user interface control 1012. The user interface control 1012 can in turn be an implementation of the FIG. 1 user interface controller 114. The user request module 1014 can be configured as an implementation of the FIG. 1 user request module 130. The data broker module 1016 can be configured to implement the FIG. 1 data broker module 132, and the dynamic access evaluation module 1018 as an implementation of the FIG. 1 dynamic access evaluation module 134. A dynamic access evaluation module 1018 can be configured as a feature of the data broker module 1016. The user process module(s) 1010 can also implement, for example, metadata coefficient collection module 1020 and data transfer module 1022. The metadata coefficient collection module 1020 can be configured to implement the FIG. 1 metadata coefficient collection module 136. The data transfer module 1022 can be configured to implement the FIG. 1 data transfer module 140.

The computer system 1000 can include a mass storage 1024, which can be connected to the hardware processor 1002 and the memory 1004 through the bus 1006. In an aspect, the computer system 1000 can also include a network interface 1026, which can be configured to interface the bus 1006, enabling the hardware processor 1002 and memory 1004 to connect through a WAN 1028, e.g., the Internet, to the FIG. 1 access modules 104.

The computer system 1000 can include a catalog logic module 1030 configured to store in the memory 1000 a catalog description of, for example, the FIG. 1 restricted-access data filed 102a through 102f, and to provide to the user process, e.g., FIG. 1 user process 116, in association with the above-described data indicator, at least a portion of the catalog description. The user process 116, as implemented for example by the user process module(s) 1010, can be further configured to display on a graphical user interface, e.g., the FIG. 1 GUI 118, a representation of the data, based at least in part on the catalog description. The catalog logic module 1030 and the user process 116, e.g., the user process module(s) 1010, can be further configured to include in the display of the catalog description an indication of whether the data is restricted access data.

The catalog logic module 1030 can be further configured to perform updating of the catalog description of the data, for example, to indicate a restricted-access data becoming accessible, e.g., upon the dynamic access evaluation module 1018 (implementing the FIG. 1 dynamic access evaluation module 134) outputting the access authorization message, or the FIG. 1 data transfer module 140 providing the data to the data cache 142.

Relationship Between Hardware Processor and Executable Program Code

The relationship between the executable program code 1008 and the hardware processor 1002 is structural; the executable program code 1008 is provided to the hardware processor 1002 by imparting various voltages at certain times across certain electrical connections, in accordance with binary values in the executable program code 1008, to cause the hardware processor to perform some action, as now explained in more detail.

A hardware processor 1002 may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app."

An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

What is claimed is:

1. A data access system for use in accessing data in a system of systems operational analytics, the data access system comprising: a processing system having a hardware processor configured to perform a predefined set of basic operations in response to receiving a corresponding basic instruction selected from a predefined native instruction set of codes;
    a memory, accessible to the processing system, the memory including a data cache; a user interface controller under control of the processing system; and
    logic, comprising a set of machine codes stored in the memory and selected from the predefined native instruction set of codes of the hardware processor, the set of machine codes including one or more modules, including a user request module, a data broker module, a dynamic access evaluation module, a metadata coefficient collection module, and a data transfer module, and implementing an application that includes:
        a user process, configured to access the system of systems operational analytics, and to implement a graphical user interface, via the user interface controller, upon a display;
        the graphical user interface being configured to accept a data indicator that indicates a data;
        the user process being configured to identify whether the data is accessible and, when the data is restricted access, to obtain a restricted-access data indicator pertaining to the data;
        the graphical user interface being configured to receive user inputs relating to task-user attributes, the task-user attributes including attributes of tasks and attributes of a user;
        the user process being further configured to determine, based at least on part on the user inputs, a task-user attribute matrix, containing first values;
        the user request module being configured to output, based at least in part on the task-user attribute matrix, a user request message containing the first values and the restricted-access data indicator;
        the data broker module being configured to perform, based at least in part on receiving the user request message, a sending of the first values to the dynamic access evaluation module, and an electronic communication to the metadata coefficient collection module of a data request message containing the restricted-access data indicator;
        the metadata coefficient collection module being configured to output, based at least in part on receiving the data request message, a data-coefficient request message to one or more access modules based on the restricted-access data indicator;
        the one or more access modules receiving the data-coefficient request message being configured to send, in association with receiving the data-coefficient request message, a metadata coefficient reply message that includes second values pertaining to the data, the second values including metadata coefficients comprising at least a sensitivity metadata coefficient, a privacy metadata coefficient, a combinability metadata coefficient, and a security metadata coefficient;
        the metadata coefficient collection module being further configured to determine, upon receiving the metadata coefficient reply message, a metadata coefficient matrix of the second values, and to output the second values, from the metadata coefficient matrix, to the dynamic access evaluation module;
        the dynamic access evaluation module being further configured to perform, upon receiving the second values from the metadata coefficient matrix, a dynamic access evaluation based at least in part on the first values and the second values and, upon a positive result of the dynamic access evaluation, to output an access authorization message, pertaining to the data; and
        the data transfer module being configured to perform an access of the data, based at least in part on the access authorization message, and to provide the data to the data cache.

2. The data access system of claim 1, the logic further comprising a catalog logic configured to store in the memory a catalog description of the data and to provide to the user process, in association with the data indicator, at least a portion of the catalog description, and the user process being further configured to display on the graphical user interface a representation of the data, the representation based at least in part on the catalog description and indicating whether the data is restricted access data.

3. The data access system of claim 2, the catalog logic being further configured to perform an updating of the catalog description of the data, upon outputting the access authorization message or the data transfer module providing the data to the data cache, the updating indicating the data is accessible.

4. The data access system of claim 1, the dynamic access evaluation module being further conf to produces an evaluation result, the evaluation result being determined between the positive result and a negative result, based on the first values and the second values and, in response to the negative result, to generate an access request denied message.

5. The data access system of claim 4, the dynamic access evaluation module being further configured to generate, in association with the negative result of the dynamic access evaluation, a report that includes identification of one or more task attributes or one or more metadata coefficients having a significance in the negative result.

6. The data access system of claim 1, the logic further comprising:
a cumulative metadata coefficient logic, configured to carry information from a plurality of previous sets of second values, the previous sets of second values being associated with previously restricted-access data that is currently accessible through previous accessing based on previous data access authorization messages; and
the dynamic access evaluation module being further configured to perform the dynamic access evaluation based at least in part on a combination of the first values, the second values, and the information from the plurality of previous sets of second values.

7. The data access system of claim 1, further comprising:
the data corresponding to the restricted-access data indicator being a restricted-access data file, among a plurality restricted-access data files; and
the one or more access modules being adapted to correspond, one-to-one, to the restricted-access data files.

8. A data access method for accessing inaccessible data, the method comprising:
accepting a data indicator that indicates data; and
identifying whether the data is restricted-access data and, when the data is restricted-access data:
accepting user inputs relating to tasks, attributes of tasks, and attributes of a user; determining a task-user attribute matrix, containing first values, based on the user inputs,
outputting a user request message containing the first values and a restricted-access data indicator,
receiving at a broker module the user request message and providing the first values, from the task-user attribute matrix, to a dynamic access evaluation module,
outputting from the broker module a data request message containing the restricted-access data indicator,
receiving, at a metadata coefficient collection module, the data request message and outputting in response a data-coefficient request message to one or more access modules based on the restricted-access data indicator, sending, from the one or more access modules receiving the data-coefficient request messages, a metadata coefficient reply message that includes second values pertaining to the data, the second values including metadata coefficients comprising at least a sensitivity metadata coefficient, a privacy metadata coefficient, a combinability metadata coefficient, and a security metadata coefficient,
receiving, at the metadata coefficient collection module, the metadata coefficient reply message from the one or more access modules and, in response, determining a metadata coefficient matrix of the second values pertaining to the data, and outputting the second values to a dynamic access evaluation module,
receiving, at the dynamic access evaluation module, the second values from the metadata coefficient matrix, and performing a dynamic access evaluation configured to produce an evaluation result that is determined, based on the first values and the second values, between a positive result and a negative result and, in response to the positive result, to output to a data transfer module an access authorization message, pertaining to the data, and
performing, by a data transfer module, based at least in part on the access authorization message, an accessing of the data and providing of the data to a data cache, the data cache being accessible to a user process.

9. The data access method of claim 8, the method further comprising: storing in a memory a catalog description of the data; and
displaying on a graphical user interface a representation of the data, the representation based at least in part on the catalog description and indicating whether the data is restricted access data.

10. The data access method of claim 9, the method further comprising updating of the catalog description of the data, upon the outputting the access authorization message or the data transfer module providing the data to the data cache, the updating indicating the data is accessible.

11. The data access method of claim 8, the dynamic access evaluation module being further configured to generate an access request denied message, in association with the evaluation result being the negative result.

12. The data access method of claim 8, further comprising generating, in association with the evaluation result being the negative result, a report that includes identification of one or more task attributes or one or more metadata coefficients having a significance in the evaluation result being the negative result.

13. The data access method of claim 8, further comprising:
carrying information from a plurality of previous sets of second values, the previous sets of second values being associated with previously restricted-access data that is currently accessible through previous accessing based on previous data access authorization messages, and
performing the dynamic access evaluation based at least in part on a combination of the first values, the second values, the information from the plurality of previous sets of second values.

14. A non-transitory computer-readable storage media, embodying computer-readable instructions, including instructions that cause a processor to:
accept a data indicator that indicates data;

identify whether the data is restricted access data and, when the data is restricted access data to:
  accept user inputs relating to tasks, attributes of tasks, and attributes of a user;
  determine a task-user attribute matrix, containing first values, based on the user inputs,
  output a user request message containing the first values and a restricted-access data indicator,
  receive at a broker module the user request message and, in response, provide the first values from the task-user attribute matrix to a dynamic access evaluation module,
  output from the broker module a data request message containing the restricted-access data indicator,
  receive at a metadata coefficient collection module the data request message and output a data-coefficient request message to one or more access modules, the one or more access modules being based on the restricted-access data indicator,
  send, from the one or more access modules, based at least in part on the data-coefficient request message, a metadata coefficient reply message to the metadata coefficient collection module, the metadata coefficient reply message including second values, the second values pertaining to the data and including metadata coefficients comprising at least a sensitivity metadata coefficient, a privacy metadata coefficient, a combinability metadata coefficient, and a security metadata coefficient,
  receive at the metadata coefficient collection module the metadata coefficient reply message from the one or more access modules and, in response, determine a metadata coefficient matrix of the second values, and output the second values from the metadata coefficient matrix to the dynamic access evaluation module,
  receive at the dynamic access evaluation module the second values from the metadata coefficient matrix and, in response, perform a dynamic access evaluation that produces an evaluation result, the evaluation result being determined between a positive result and a negative result, based on the first values and the second values and, in response to the positive result, to output to a data transfer module an access authorization message, pertaining to the data, and
  receive at the data transfer module, the access authorization message and, in response, access the data and provide the data to a data cache, the data cache being accessible to a user process.

15. The non-transitory computer-readable storage media of claim 14, the computer-readable instructions further including instructions that cause the processor to:
  store in a memory a catalog description of the data; and
  display on a graphical user interface a representation of the data, the representation based at least in part on the catalog description and indicating whether the data is restricted access data.

16. The non-transitory computer-readable storage media of claim 15, the computer-readable instructions further including instructions that cause the processor to update the catalog description of the data, in association with the output of the access authorization message or in association with the data transfer module providing the data to the data cache, the update indicating the data is accessible.

17. The non-transitory computer-readable storage media of claim 14, the computer-readable instructions further including instructions that cause the processor to generate, in association with the evaluation result being the negative result, an access request denied message.

18. The non-transitory computer-readable storage media of claim 14, the computer-readable instructions further including instructions that cause the processor to generate a report, in association with the evaluation result being the negative result or a detecting that the evaluation result will be the negative result, the report including identification of one or more task-user attributes or of one or more metadata coefficients having a significance in the evaluation result being the negative result.

19. The non-transitory computer-readable storage media of claim 14, the computer-readable instructions further including instructions that cause the processor to:
  carry information from a plurality of previous sets of second values, the previous sets of second values being associated with previously restricted-access data that is currently accessible through previous accessing based on previous data access authorization messages, and
  perform the dynamic access evaluation based at least in part on a combination of the first values, the second values, the information from the plurality of previous sets of second values.

* * * * *